(12) United States Patent
Kakkar et al.

(10) Patent No.: US 10,921,505 B2
(45) Date of Patent: Feb. 16, 2021

(54) LIGHTING ARRANGEMENT WITH LIGHT GUIDE

(71) Applicant: Lumileds LLC, San Jose, CA (US)

(72) Inventors: Varun Dev Kakkar, Eindhoven (NL); Hugo Johan Cornelissen, Escharen (NL); Giovanni Cennini, Eindhoven (NL)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 16/300,095

(22) PCT Filed: Apr. 27, 2017

(86) PCT No.: PCT/EP2017/060022
§ 371 (c)(1),
(2) Date: Nov. 9, 2018

(87) PCT Pub. No.: WO2017/194315
PCT Pub. Date: Nov. 16, 2017

(65) Prior Publication Data
US 2019/0146136 A1    May 16, 2019

(30) Foreign Application Priority Data
May 12, 2016  (EP) .................................. 16169288

(51) Int. Cl.
*G02B 6/00* (2006.01)
*F21V 7/04* (2006.01)
(Continued)

(52) U.S. Cl.
CPC .......... *G02B 6/0031* (2013.01); *F21V 7/0025* (2013.01); *G02B 6/002* (2013.01); *G02B 6/0065* (2013.01); *G02B 6/0066* (2013.01)

(58) Field of Classification Search
CPC ...... G02B 6/002; G02B 6/0031; F21V 7/0025
See application file for complete search history.

(56) References Cited

U.S. PATENT DOCUMENTS 6,161,935 A * 12/2000 Oyama ................... F21V 13/04
362/609
9,297,513 B2 * 3/2016 Kim .......................... F21V 7/00
(Continued)

FOREIGN PATENT DOCUMENTS

WO    WO-2017194315 A1   11/2017

OTHER PUBLICATIONS

"International Application Serial No. PCT/EP2017/060022, International Preliminary Report on Patentability dated Nov. 22, 2018", 9 pgs.

(Continued)

*Primary Examiner* — Eric Wong
(74) *Attorney, Agent, or Firm* — Schwegman Lundberg & Woessner, P.A.

(57) ABSTRACT

A lighting arrangement and a method of coupling light into a light guide are described. A light source is embedded within a light guide. The light guide includes first and second outer surfaces arranged on opposite sides. A forward direction extends from the light source parallel to the first outer surface. A collimator is embedded within the light guide. The collimator comprises a first reflector surface facing towards the second outer surface and a second reflector surface facing towards the first outer surface. The light source is arranged to emit light between the first and second reflector surfaces. The first reflector surface is arranged at least substantially parallel to the forward direction. At least a portion of the second reflector surface is arranged under an angle to the forward direction.

11 Claims, 2 Drawing Sheets

(51) Int. Cl.
*F21V 8/00* (2006.01)
*F21V 7/00* (2006.01)

(56) References Cited

U.S. PATENT DOCUMENTS

| | | | |
|---|---|---|---|
| 2004/0041521 A1* | 3/2004 | Mandler | H01L 27/156 |
| | | | 313/512 |
| 2007/0139961 A1* | 6/2007 | Cheah | H05K 1/189 |
| | | | 362/612 |
| 2008/0186733 A1 | 8/2008 | Ho et al. | |
| 2008/0316760 A1 | 12/2008 | Schug et al. | |
| 2009/0256996 A1* | 10/2009 | Suzuki | G02B 6/0063 |
| | | | 349/62 |
| 2010/0134722 A1* | 6/2010 | Huang | G02F 1/133308 |
| | | | 349/65 |
| 2013/0033864 A1 | 2/2013 | Spinger et al. | |
| 2013/0070480 A1* | 3/2013 | Griffin | G02B 6/0028 |
| | | | 362/612 |
| 2013/0155676 A1* | 6/2013 | Lee | F21V 7/28 |
| | | | 362/235 |
| 2014/0321111 A1* | 10/2014 | McLean | G09F 13/18 |
| | | | 362/223 |

OTHER PUBLICATIONS

"International Application Serial No. PCT/EP2017/060022, International Search Report dated Jul. 20, 2017", 4 pgs.
"International Application Serial No. PCT/EP2017/060022, Written Opinion dated Jul. 20, 2017", 7 pgs.

\* cited by examiner

LIGHTING ARRANGEMENT WITH LIGHT GUIDE

TECHNICAL FIELD

The invention relates to a lighting arrangement and to a method of coupling light into a light guide.

BACKGROUND ART

Light propagates within a light guide, i. e. a transparent solid body, based on the principle of total internal reflection (TIR). The transparent material of a light guide, such as e. g. silicone, has a higher density than a surrounding material, e. g. air. Rays of light striking the medium boundary at an incident angle larger than a critical angle are entirely reflected.

Different types and shapes of light guides are known. In particular, light guides of e. g. plane shape may be used for illumination purposes. By light propagation for long distances within the light guide, a very efficient mixing of light from several light sources, e. g. LEDs can be achieved to allow uniform extraction of light from an exit surface.

In order to direct light from a light source, in particular from a LED, into the light guide it is known to provide the light source embedded within the light guide, i. e. such that the light emitting surface of the LED is in direct contact with the light guide material. However, for light sources emitting light over a wide angular range, such as a lambertian emitter, measures need to be taken to avoid bright spots on an outer surface of the light guide due to light emitted from the light source striking the outer surface under an incident angle below the critical angle.

U.S. Pat. No. 9,297,513 B2 discloses a display apparatus with an illumination unit, the illumination unit includes a first and a second reflector, a light source module placed between the first and second reflector of the illumination unit, and a bracket configured to support the light source module. The bracket includes a body configured to connect one side of the first reflector to one side of the second reflector. The apparatus may comprise an optical member. An air guide may be defined between the second reflector and the optical member.

US2008/0186733 A1 discloses a backlight module including al light guide plate and a light source. The light source is provided with multiple light emitting diodes on a substrate. One side of the light guide plate is disposed with multiple recesses to allow insertion in place by each respective light emitting diode thus for the light emitted from the light source to enter from a side of the light guide plate. A light emitting diode may be placed in a casing having opposed first and second sides.

SUMMARY OF THE INVENTION

It may be considered an object to propose a lighting arrangement and a method of coupling light into a light guide which avoid bright spots on the outer surface of the light guide while maintaining small dimensions in traverse direction.

In view of this object, a lighting arrangement according to claim 1 and a method according to claim 10 are proposed. Dependent claims refer to preferred embodiments.

According to an aspect of the invention, a lighting arrangement includes a light source embedded within a light guide. A single light source or multiple light sources may be provided, in particular multiple light sources arranged in an array or in a line. While generally any type of light source may be used, solid state lighting elements are preferred, such as light emitting diodes (LED), organic light emitting diodes (OLED), laser diodes etc.

The light guide may be of any material suitable for the propagation of light, e. g. glass or transparent plastic.

The light guide includes at least a first and opposed second outer surface. A forward direction may be defined as extending from the light source into a direction along the light guide parallel to the first outer surface. The light guide may be generally of any shape, such as e. g. cylindrical, flat, prism-shaped, etc. In the preferred case of a flat shape, the opposed first and second outer surfaces may be arranged in parallel, or in the case of a flat shape with varying thickness (wedge shape) inclined relative to one another.

According to one aspect, a collimator is embedded within the light guide. The collimator comprises at least a first and a second reflector surface. A first reflector surface is arranged to face toward the second outer surface and the second reflector surface is arranged to face towards the first outer surface. The light source is arranged to emit light between the first and second reflector surfaces. Thus, the reflector surfaces of the collimator may serve to shape the light emitted from the light source to propagate within the light guide. In particular, the collimator may serve to limit the width of the beam emitted with the respect the depth or thickness dimension of the light guide, e. g. the direction perpendicular to the first outer surface.

According to one aspect, the first reflector surface may be arranged at least substantially parallel to the forward direction, whereas the second reflector surface may be arranged under an angle to the forward direction. Compared to a collimator where both the first and second reflector surface are inclined, such a configuration may be provided with a reduced thickness, measured in the depth direction of the light guide, e. g. perpendicular to the first surface. In the present context, the term "substantially parallel" may be understood to include exactly parallel directions as well as slight deviations therefrom, which may be below 5°, preferrably below 3°, most preferably below 1°.

The member carrying the first reflector surface, which may e. g. be designated a first reflector member, contributes very little to the thickness, as it may extend in parallel to the forward direction. The member carrying the second reflector surface, i. e. second reflector member may be arranged to extend under an angle to the forward direction. The total thickness required to appropriately limit the width of the light emitted from the light source in between the first and second reflector surface can be kept relatively small.

According to one embodiment, the angle of the second reflector surface and the length of the first and second reflector surfaces may be chosen such that light emitted from the light source is directed along the light guide into such direction that an angle of incidence of the light, at least at first contact with either the first or second outer surface, is above a critical angle, such that total internal reflection occurs. As examples given in the description of preferred embodiments show, for a given critical angle and a given minimum distance between the first and second reflector surface (corresponding to the height of the light source which may be arranged in between), the dimensions of the first and second reflector surfaces may be chosen accordingly dependent on the angle of the second reflector surface to ensure emission of all rays of light under suitable angles to ascertain TIR properties.

In preferred embodiments the angle of inclination of the second reflector surface relative to the forward direction may be e.g. 2.5-25°. Since, as shown in the detailed embodiments, lower angles may require quite long collimator lengths, the angle of inclination is further preferred to be at least 5°, or at least 6°. Most preferably, the angle of inclination may be 7 20°.

According to a further preferred embodiment, the first reflector surface may extend into the forward direction for a first reflector length, measured from the light source and the second reflector surface may extend into the forward direction for a second reflector length, also measured from the light source. Preferably, the second reflector length is greater than the first reflector length. Particularly, it is preferred to provide a second reflector length which is at least 15% greater than the first reflector length. Further preferred, the quotient of the second reflector length divided by the first reflector length is at least 1.3, in particular for angles of inclination of the second reflector surface of 5° or more. Further preferred, in particular for angles of inclination of 7.5° or more, the quotient may be at least 1.5. In some embodiments, in particular for greater angles of inclination, the quotient may be above 1.7 or even above 2.

According a preferred embodiment the collimator may include at least a first and second reflector member. The first reflector member comprises the first reflector surface and the second reflector member comprises the second reflector surface. The reflector members may for example be plane mirror elements embedded within the light guide material. In correspondence with the arrangement of the reflector surfaces, the first reflector member may be arranged in parallel to the forward direction and the second reflector member may be arranged under an angle thereto.

According to one preferred aspect, the second reflector surface may include multiple portions arranged under different directions. For example, the second reflector surface may include a first position extending at least substantially parallel to the forward direction and a second position extending under the above described angle to the forward direction. The first and second position may each be plane and may be separated by an edge.

While the light guide may be of any shape and dimensions, it is preferred to provide a light guide of flat shape, either with parallel first and second surfaces or wedge shaped. The light source may be arranged at one edge thereof. Further preferably, multiple light sources may be arranged along an edge. The corresponding collimator, or multiple collimators, may also extend parallel to the edge.

These and other aspects of the invention will be apparent from and elucidated with reference to the embodiments described hereinafter.

DESCRIPTION OF EMBODIMENTS

Figure 1:
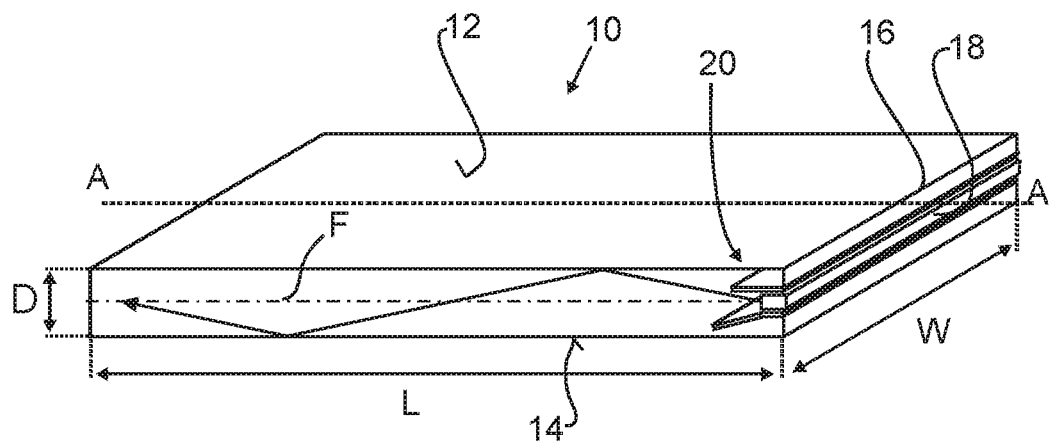
FIG. 1 shows a perspective view of a lighting arrangement according to one embodiment.

FIG. 1 shows a flat, plane light guide 10 with a thickness D, width W and length L. The light guide 10 comprises opposed upper and lower surfaces 12, 14 and is bordered by edges. Along one edge 16, a light source 18 is arranged with a collimator 20.

As schematically shown in FIG. 1, light from the light source 18 is coupled into the light guide 12. The light guide 12 is made out of a transparent material, e. g. silicone. Light is emitted from the light source 18 through the collimator 20 to propagate within the light guide 10.

A critical angle above which total internal reflection (TIR) occurs depends on the optical indices of the material of the light guide 10 and the surrounding medium, e. g. air. For example, for a silicone light guide with surrounding air, the critical angle is approximately 45.17°. Light striking the boundary surfaces 12, 14 at incident angles above the critical angle is fully reflected due to TIR.

Figure 2:
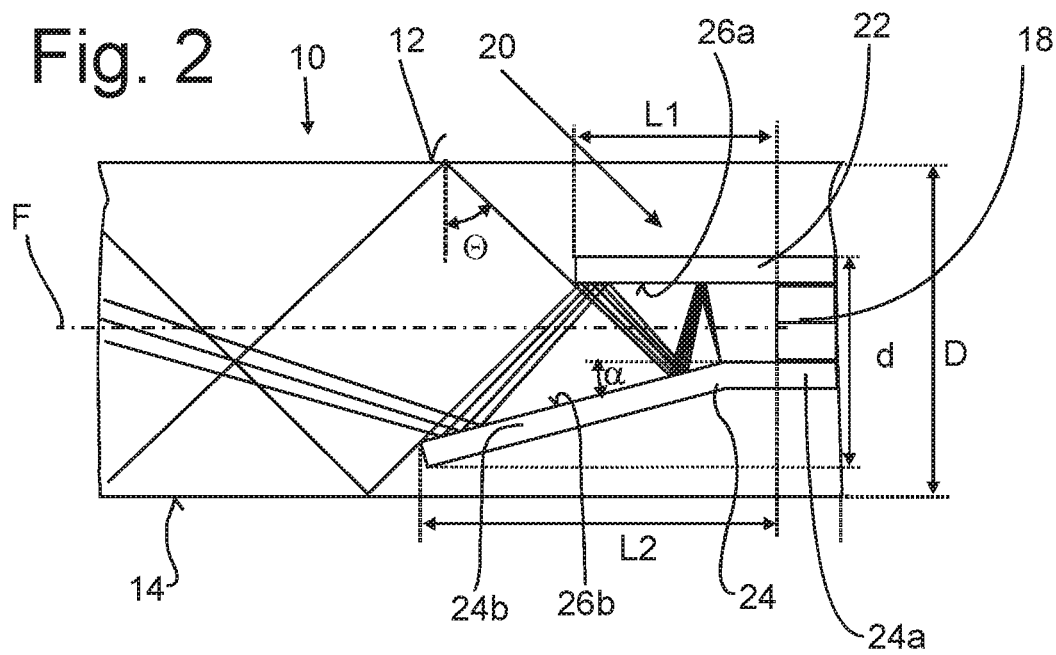
FIG. 2 shows a sectional view of the lighting arrangement of FIG. 1 with the section along A . . . A.

FIG. 2 shows the light source 18 and the collimator 20 arranged along the edge 16 of the light guide 10 in a more detailed, enlarged sectional view.

The light source 18 and the collimater 20 are embedded in the transparent material of the light guide 10. The light source 18 is one of a row of side emitting LEDs arranged along the edge 16. An optical axis, or forward direction F may be defined from the center of the light emitting surface of the LED 18 along the length L of the light guide 10, i. e. parallel to the upper surface 12 thereof. Since in the examples shown the lower surface 14 of the light guide 10 is arranged parallel to the upper surface 12, the forward direction F is also parallel to the lower surface 14.

In the example shown, the light source 18 is arranged between a first, upper collimator member 22 and a second, lower collimator member 24. The height of the light source 18 may correspond to the minimum distance between the upper and lower collimator members 22, 24. Each of the collimator members are plane mirror elements arranged in parallel to the edge 16.

The collimator 20 comprises opposed inner reflector surfaces 26a, 26b. The first reflector surface 26a is arranged on the first collimator member 22 and the second, lower reflector surface 26b is arranged on the second reflector member 24.

The first collimator member 22 extends in parallel to the forward direction F for a first collimator length L1, measured from the forward facing light emitting surface of the light source 18. The second reflector member 24 comprises a first portion 24a extending in parallel to the forward direction F and a second portion 24b arranged inclined at an angle $\alpha$ relative to the forward direction F. The second collimator member 24 extends, measured from the light source 18, into the forward direction F for a second collimator length L2.

The length L2 is greater that the length L1. In the example shown, the angle $\alpha$ of the inner reflector surface 26a relative to the forward direction F is about 15°. The length L2 is about 80% greater than the length L1.

The shape of the collimator 20 is thus asymmetrical.

The inner surfaces 26a, 26b of the collimator 20 are arranged to limit the width of the beam emitted from the light source 18 in the depth direction D such that all light emitted will be coupled into the light guide 10 to undergo total internal reflections at either the upper surface 12 or lower surface 14 thereof. Light from the light source 18 as a lambertian emitter that is not directed relatively parallel to the forward directions F will be reflected at the first and/or second reflector surfaces 26a, 26b. Exemplary beam paths are shown in FIG. 2. Each reflection of a ray on the inclined lower reflector surface 26b increases the angle relative to the thickness direction D by twice the angle $\alpha$.

As shown, the angle α and the lengths L1, L2 of the reflector members 22, 24 are chosen such that each and every ray emitted out of the collimator is directed to have, when it strikes the upper or lower surface 12, 14, an angle of incidence Θ which is higher that the critical angle and will thus undergo total internal reflection and propagate within the light guide 12.

The thickness d of the collimator 20 as shown in FIG. 2 is relatively small. Since the first reflector member 22 is not inclined, it does not substantially contribute to the thickness d. The second portion 24b of the second collimator member 24 extends at a relatively small angle of, in the example, α=15°. The total thickness d is thus kept relatively small. Still, as shown, all light emitted from the light source 18 will undergo total internal reflection and propagate within the light guide 10.

Figure 3:
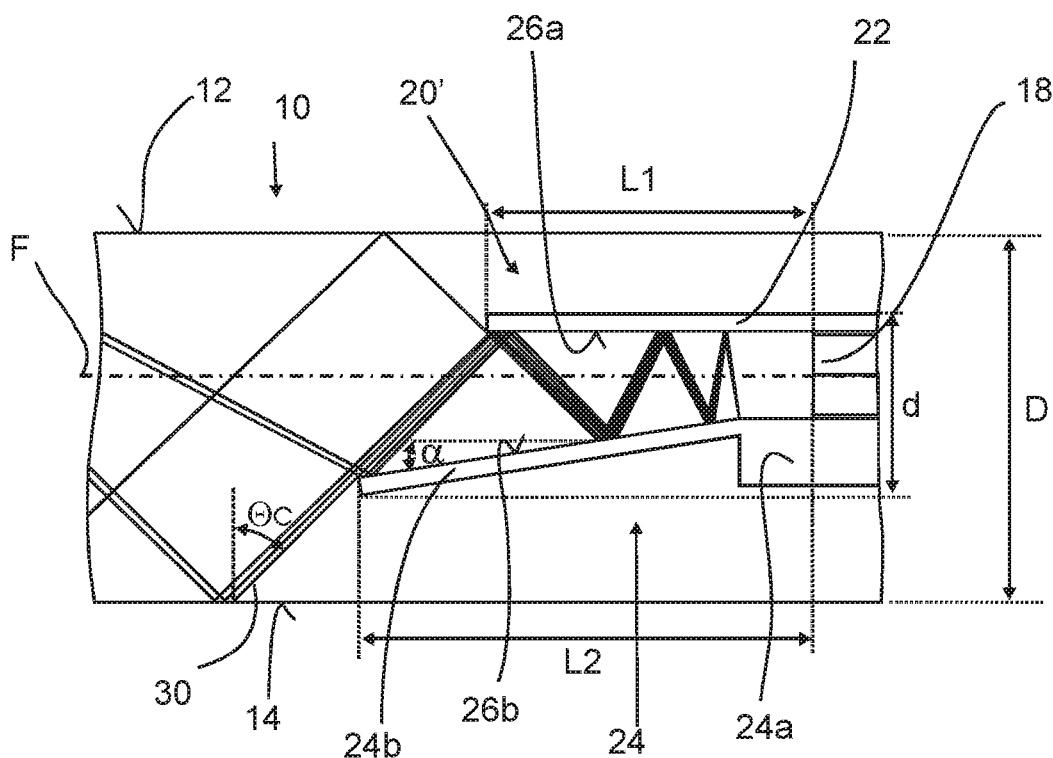
FIG. 3 shows a sectional view of a second embodiment of a lighting arrangement.

FIG. 3 shows a second embodiment of a light guide 10 with an embedded light source 18 and collimator 20'. The second example differs from the first example according to FIG. 2 by a slightly different shape of the collimator 20'. The following description will focus on the differences between the embodiments. Common elements will be designated by like numerals.

The collimator 20' in the second example has a lower reflector surface 26b inclined at a smaller angle of α=10°.

The example of FIG. 2 has been purposely constructed just smaller than the dimensions actually required for redirecting light to undergo total internal reflection. One ray 30, which undergoes two reflections at the lower reflector surface 26b and three reflections at the upper reflector surface 26a strikes the lower surface 14 of the light guide 10 at exactly the critical angle Θc.

Thus, the skilled person will realize that it will be sufficient to provide the lower reflector surface 26b with only a slightly larger length L2 to ensure total internal reflection for all light emitted from the light source 18.

It should be noted that the above-mentioned embodiments illustrate rather than limit the invention, and that those skilled in the art will be able to design many alternative embodiments without departing from the scope of the appended claims. For example, the shape of the light guide may be different from the light guide 10 shown in the above examples. Rather than a flat shape with opposed parallel surfaces 12, 14, the light guide 10 may e. g. be rounded, elongated or have inclined surfaces.

Also, the actual shape of the collimator may differ from the collimators 20, 20' shown above. In particular, the angle α of the lower reflector surface 26b and the lengths L1, L2 may vary.

Different values for the angle α and the lengths L1, L2 may be chosen dependent on one another in order to achieve TIR conditions for all light emitted. The number of reflections at the lower reflector surface 26b required to ensure total internal reflection is dependent on the critical angle and on angle α of the lower reflector surface 26b.

Considering, for example, a refractive index of the light guide 12 material of 1.41 (for silicone material, yielding a critical angle at a boundary surface to air of 45.17°), and a light source height (or closest distance of the upper and lower reflector surfaces 26a, 26b) of 0.52 mm, for angles α of greater than 22.5°, only one reflection at the lower reflector surface 26b would be required to achieve an incident angle at the upper or lower surfaces 12, 14 above the critical angle. For angles between 11.25° and 22.5°, a minimum of two reflections would be needed. For angles between 7.5° and 11.25°, three reflections minimum, and for angles below 7.5°, at least four reflections would be needed.

The lengths L1, L2 thus need to be chosen accordingly to achieve the required minimum number of reflections and ensure that all beams are emitted under TIR conditions.

Figure 4:
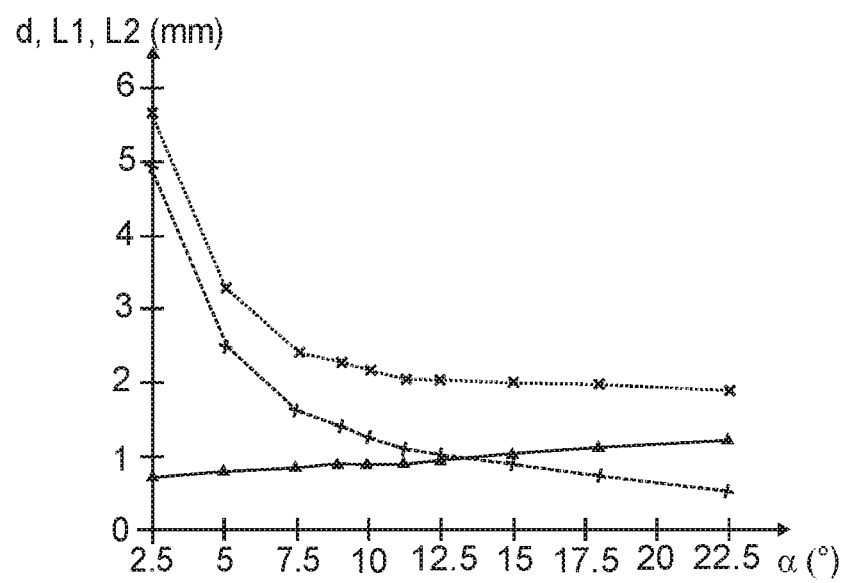
FIG. 4 shows a diagram of the length and thickness of a collimator and its parts dependent on an angle.

FIG. 4 shows a diagram of the dimensions of the collimator 20 for the example of a 0.52 mm light source height and a refractive index of 1.41. Shown on the horizontal axis are the values for the angle α of the lower reflector surface 26b. Shown on the vertical axis are the resulting minimum values for the lengths L1, L2 of the upper and lower reflector surfaces 26a, 26b, and for the total collimator thickness d (or height, measured in depth direction).

As visible, for angles α below 7.5°, a relatively long collimator 20 is required. From values for α of 7.5° and above, the required values for the lengths decrease almost linearly. The total collimator thickness d increases about linearly from approximately 0.8 mm at an angle of 2.5° to about 1.2 mm at an angle of about 22.5°. It may be observed that the total collimator thickness d changes rather little overall, such that in all of the examples a small collimator thickness d is achieved.

The overall dependency of the lengths L1, L2 on the angle α is non-linear, as shown in FIG. 4. The quotient by which the length L2 is larger than the length L1 is shown for the example of FIG. 4 in the following table.

| Angle α | Length L1 | Length L2 | quotient L2/L1 |
| --- | --- | --- | --- |
| 2.5° | 4.92 mm | 5.68 mm | 1.15 |
| 5.0° | 2.48 mm | 3.30 mm | 1.33 |
| 7.5° | 1.62 mm | 2.46 mm | 1.52 |
| 9.0° | 1.40 mm | 2.30 mm | 1.64 |
| 10.0° | 1.26 mm | 2.20 mm | 1.75 |
| 11.3° | 1.10 mm | 2.06 mm | 1.87 |
| 12.5 | 1.01 mm | 2.00 mm | 1.98 |
| 15° | 0.90 mm | 1.98 mm | 2.20 |
| 18° | 0.74 mm | 1.94 mm | 2.62 |
| 20° | 0.66 mm | 1.94 mm | 2.94 |
| 22.5° | 0.52 mm | 1.88 mm | 3.62 |

In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The mere fact that certain measures are recited in mutually different dependent claims does not indicate that a combination of these measures cannot be used to advantage.

The invention claimed is:

1. A lighting apparatus, comprising:
   a light guide formed as a transparent solid body, the transparent solid body extending between a first outer surface and a second outer surface that opposes the first outer surface;
   a light source embedded in the light guide and configured to emit light into the light guide, the light guide and the light source defining a forward direction that extends from the light source parallel to the first outer surface;
   a first reflector surface embedded in the light guide and facing towards the second outer surface, the first reflector surface being substantially parallel to the forward direction; and
   a second reflector surface embedded in the light guide and facing towards the first outer surface,
   the light source being arranged to emit the light between the first reflector surface and the second reflector surface, the second reflector surface being disposed on a second reflector member, at least a portion of the second reflector surface being substantially planar and angled with respect to the forward direction and terminating at an end of the second reflector member.

2. The lighting apparatus of claim 1, wherein:

the first reflector surface extends into the forward direction for a first reflector length measured from the light source;

the second reflector surface extends into the forward direction for a second reflector length measured from the light source; and the second reflector length is greater than the first reflector length.

3. The lighting apparatus of claim 2, wherein the second reflector length is at least 20% greater than the first reflector length.

4. The lighting apparatus of claim 1, wherein the portion of the second reflector surface and the forward direction are angled by an angle; and the angle, the first reflector length, and the second reflector length are selected such that light emitted from the light source is directed along the light guide into directions such that an angle of incidence at the first outer surface or the second outer surface is above a critical angle and is reflected via total internal reflection at the first outer surface or the second outer surface.

5. The lighting apparatus of claim 1, wherein the second reflector surface is angled between 2.5 degrees and 25 degrees, with respect to the forward direction.

6. The lighting apparatus of claim 1, wherein the second reflector surface is angled between 7 degrees and 20 degrees, with respect to the forward direction.

7. The lighting apparatus of claim 1, wherein the first reflector surface is disposed on a first reflector member.

8. The lighting apparatus of claim 1, wherein the second reflector surface includes at least a first portion that is substantially parallel to the forward direction and a second portion that is angled with respect to the forward direction.

9. The lighting apparatus of claim 1, wherein the light guide is generally flat and the light source is arranged at an edge of the light guide.

10. The lighting apparatus of claim 1, wherein the second reflector surface includes a first portion located proximate the light source, the first portion being substantially planar and substantially parallel to the first reflector and extending to the end of the second reflector.

11. The lighting apparatus of claim 10, wherein the second reflector surface further includes a second portion that adjoins the first portion such that the first portion is located between the second portion and the light source, the second portion being substantially planar and angled with respect to the first reflector and extending to the end of the second reflector.

* * * * *